UNITED STATES PATENT OFFICE 2,611,731

ANTIBIOTIC PREPARATIONS

Albert L. Rawlins, Grosse Pointe Woods, and James A. Sultzaberger, Detroit, Mich., assignors to Parke, Davis & Company, Detroit, Mich., a corporation of Michigan No Drawing. Application September 3, 1946, Serial No. 694,674

12 Claims. (Cl. 167—65)

This invention relates to stable aqueous solutions of water-insoluble antibiotics and to a process for obtaining the same. More particularly, the invention relates to stable aqueous solutions of the antibiotic known as tyrothricin.

Tyrothricin is a natural occurring bacterial agent found in the aerobic, spore-bearing bacterium, Bacillus brevis, and is composed of a mixture of the antibiotics gramicidin and tyrocidine. Tyrothricin cannot be injected into the human blood stream because it causes hemolysis but it is, nevertheless, a very useful and effective germicide for topical use and for use in certain infections of the pleural cavity. However, in the past its topical use has been unsatisfactory and rather limited due to the fact that it is insoluble in water. This water insolubility has made it necessary to apply tyrothricin as an alcohol solution or as a freshly prepared water-alcohol suspension. The alcohol solutions are unsatisfactory for use in the treatment of the nasal sinuses and eye infections due to the alcohol present in the preparations. Likewise, the use of water-alcohol suspensions of tyrothricin is objectionable as they must be freshly prepared because of the tendency of the tyrothricin to agglomerate and settle out. An even more important disadvantage of these suspensions is that the water-insoluble tyrothricin is present in the solid form which makes it impossible to secure a homogeneous coverage of the infected area. Moreover, a major portion of the tyrothricin, when applied by this method, is not utilized because of the insolubility of the relatively large particles present in the dried film.

It is an object of this invention to produce clear aqueous solutions of tyrothricin.

Another object of the invention is to provide aqueous solutions of tyrothricin which retain their bactericidal character over long periods of time.

It is also an object of this invention to provide aqueous solutions of tyrothricin which are physically stable and from which the tyrothricin does not separate even on long storage.

A further object of the invention is to produce aqueous solutions of tyrothricin which are non-irritating and non-toxic.

Still another object of the invention is to provide aqueous solutions of the above character which are odorless and palatable.

A still further object of the invention is to provide aqueous solutions of tyrothricin suitable for topical use and as inhalants and as injectable veterinary preparations for use in the treatment of mastitis.

In accordance with the invention these and other objects which will appear hereinafter are accomplished by adding to a concentrated alcoholic solution of tyrothricin a large volume of water containing as a solubilizer for the tyrothricin a member of a particular class of quaternary ammonium salts. This class of quaternary ammonium salts may be represented by the general formula,

wherein R is a straight chain alkyl radical containing twelve to eighteen carbon atoms inclusive, $R_1$, $R_2$ and $R_3$ are the same or different and represent methyl or ethyl groups and X is a chlorine or bromine atom or the anion of a lower aliphatic monocarboxylic acid.

We have found that quaternary ammonium salts of the above general formula solubilize tyrothricin to give clear, stable aqueous preparations whereas other wetting agents of the quaternary ammonium salt type either fail to solubilize tyrothricin or else solubilize it but cause rapid destruction of its bactericidal properties. The specificity of the solubilizing action possessed by the compounds of the present invention will be readily apparent from examination of the structure of some closely related quaternary ammonium salts which fail to produce satisfactory aqueous solutions of tyrothricin. For example, compounds such as n-decyl-dimethyl-benzyl-ammonium bromide, n-dodecyl-dimethyl-benzyl-ammonium bromide and n-tetradecyl-dimethyl-benzyl-ammonium bromide fail to increase the water solubility of tyrothricin while quaternary ammonium salts such as p-t-octylphenoxyethoxyethyl - dimethyl - benzyl - ammonium chloride and p-t-octylphenoxyethoxyethyl-trimethyl-ammonium chloride solubilize tyrothricin but fail to produce solutions which retain their germicidal character. Aqueous solutions of tyrothricin prepared by the use of a solubilizer of this latter type lose their bactericidal properties within a month at room temperature whereas the tyrothricin solutions of the present invention retain all of their bactericidal activity for at least a year even when stored at elevated temperatures, e. g. at 37° C. or 45° C.

The amount of solubilizer which we use in the preparation of our new products depends on the concentration of tyrothricin desired in the final solution. In general, dilute solutions such as those containing tyrothricin in a dilution of 1 to 5000, require the use of about equal amounts of solubilizer and tyrothricin while in the more concentrated solutions, that is, those containing about 2% tyrothricin, only about one-half as much solubilizer is needed. The actual percentage of the solubilizer present in these preparations is small and varies from between about 0.02 to 1.5% depending on the concentration of the tyrothricin in the solution.

Since only small amounts of the solubilizers are necessary to produce these stable, aqueous solutions of tyrothricin, the preparations are completely free from any toxic and irritating effects and may be used even on such sensitive tissues as those of the eyes and nose. Moreover, these solubilizers do not impart any objectionable tastes and odors to the solutions which is very important in preparations intended for use as inhalants. Another important property of these new tyrothricin solutions is that they are physically and bactericidally compatible with water soluble salts of vasoconstrictors such as aphedrine, epinephrine, benzedrine, neosynephrin and the like. This property makes it possible to incorporate a vasoconstrictor with these solutions to produce a very effective inhalant preparation.

The tyrothricin solutions produced in accordance with the present invention are suitable for veterinary and human usage. Their principal veterinary use is in the treatment of bovine mastitis wherein they are injected directly into the various quarters of the udder. In the treatment of human afflictions these solutions may be applied topically to infected wounds, ulcers and abscesses of the skin and soft tissues. They are also useful in the treatment of osteomyelitis, certain infections of the pleural cavity, nasal sinuses and in some infections of the eye. Particularly effective preparations for the treatment of the nasal sinuses are those which contain, in addition to the tyrothricin, a vasoconstrictor such as a water-soluble salt of ephedrine, epinephrine and the like. These latter solutions may be used in the form of a vapor, spray or mist but they are preferably applied to the infected area by instillation of a small amount of the solution into each nostril.

The invention is illustrated by the following examples.

*Example 1*

A solution of 0.15 g. of cetyl-trimethyl-ammonium acetate in 30 cc. of distilled water is added to a solution of 0.3 g. of tyrothricin in 5.27 cc. of 95% alcohol and the resulting solution diluted to 100 cc. with distilled water.

The clear solution prepared in the above manner is physically and bactericidally stable for over a year. It is odorless, non-toxic and non-irritating. It contains 0.3% tyrothricin and may be diluted as many as five to ten times without causing precipitation of the tyrothricin. These solutions are especially useful in the treatment of bovine mastitis. For example, particularly satisfactory results may be obtained by injecting 50 cc. of the concentrated solution (150 mg. of tyrothricin) into each quarter of the udder.

*Example 2*

A solution of 2.0 g. of cetyl-trimethyl-ammonium acetate in 35 cc. of distilled water is added to a solution of 2 g. of tyrothricin in 6.65 cc. of 95% alcohol and the resulting solution diluted to 100 cc. with distilled water. This preparation is a clear, colorless, odorless, non-toxic and non-irritating aqueous solution containing 2% tyrothricin. It retains its full bactericidal potency for at least a year and is physically stable for even longer periods of time. This solution may be diluted with as many as six volumes of water without causing precipitation of the tyrothricin. These dilute solutions are particularly suitable for topical application to infected wounds, ulcers and abscesses of the skin and soft tissues. They may also be used in treatment of osteomyelitis, certain infections of the pleural cavity, nasal sinus and the eye.

*Example 3*

A solution containing 15.8 g. of ephedrine lactate is prepared in 300 cc. of distilled water and 27.6 g. of dextrose added to the solution to render the final preparation isotonic. In a separate container 0.2 g. of tyrothricin is dissolved in 2 cc. of 95% alcohol, the solution allowed to stand for two hours and then filtered through paper. The tyrothricin solution is added to a solution of 0.2 g. of cetyl-trimethyl-ammonium acetate in 2 cc. of 95% alcohol, the resulting solution added to the previously prepared ephedrine solution and the mixture diluted to 1000 cc. with distilled water.

The preparation prepared as described above is a clear, odorless, non-toxic and non-irritating aqueous solution contianing 20 mg. of tyrothricin per 100 cc. This solution is physically and bactericidally stable for over a year even when stored at elevated temperatures such as 37° or 45° C. It is particularly useful as an inhalant in the treatment of congested or infected nasal sinuses.

*Example 4*

4 cc. of a 10% alcoholic solution of tyrothricin is added to 4 cc. of an alcoholic solution containing 0.4 g. of cetyl-trimethyl-ammonium chloride and the resulting solution added to a solution of 15.8 g. of ephedrine lactate and 27.6 g. of dextrose in 1090 cc. of distilled water.

This preparation is a clear, odorless, stable aqueous solution containing 40 mg. of tyrothricin per 100 cc. It is particularly useful as an inhalant and exhibits physiological properties similar to those shown by the preparation of Example 3.

*Example 5*

0.1 g. of cetyl-trimethyl-ammonium bromide is dissolved in 1 cc. of alcohol and the solution diluted with 300 cc. of distilled water. The aqueous solution of the solubilizer is then added with stirring to a solution of 1 g. of tyrothricin in 1 cc. of alcohol and the resulting solution diluted to a volume of 500 cc. with distilled water.

This preparation is a clear, stable, non-toxic and non-irritating aqueous solution of tyrothricin which retains its bactericidal properties for over a year. Because of its non-toxic and non-irritating character this solution may be used in the treatment of certain infections of the eye and nose.

*Example 6*

A solution of 1 g. of n-dodecyl-triethyl-ammonium propionate in 50 cc. of distilled water is added to a solution of 1 g. of tyrothricin in 4 cc. of 95% alcohol and the resulting solution diluted to 100 cc. with distilled water. This clear, stable, aqueous tyrothricin preparation is strongly bactericidal and is particularly useful for topical application.

*Example 7*

A solution of 0.5 g. of n-tetradecyl-dimethyl-ethyl-ammonium acetate in 40 cc. of distilled water is added to a solution of 0.8 g. of tyrothricin in about 7.5 cc. of 95% alcohol and the resulting solution diluted to 100 cc. with distilled water. The tyrothricin solution prepared in this manner possesses the same properties as the preparation of Example 1 and like that preparation is particularly useful in the treatment of bovine mastitis.

*Example 8*

A solution of 0.15 g. of n-octadecyltrimethyl-ammonium chloride in 50 cc. of distilled water is added to a solution of 0.1 g. of tyrothricin in 2.5 cc. of alcohol and the resulting solution diluted to 200 cc. with distilled water. This clear aqueous solution is stable and retains its germicidal character even on long storage. It is also odorless, non-toxic and non-irritating and because of these properties is particularly useful as a topical disinfectant.

What we claim as our invention is:

1. A clear, essentially aqueous antibiotic concentrate comprising an antibiotic selected from the class consisting of tyrothricin and one of its therapeutically active components and as a solubilizer therefor a water-soluble salt of an organic quaternary ammonium compound having three lower alkyl groups and one long chain alkyl group all attached directly to the pentavalent nitrogen atom, in which the lower alkyl groups each contain no more than two carbon atoms; said concentrate yielding on dilution with an aqueous solvent a clear, stable solution containing the antibiotic in a concentration greater than its solubility in an otherwise identical solution not containing the solubilizer, said concentration being sufficient to manifest antibiotic activity.

2. An antibiotic composition as specified in claim 1 in which the water-soluble salt has an anion of a lower aliphatic mono-carboxylic acid containing not more than 4 carbon atoms.

3. An antibiotic composition as specified in claim 1 in which the solubilizer is cetyl-trimethyl-ammonium acetate.

4. An antibiotic composition as specified in claim 1 in which the water-soluble salt is a halide.

5. An antibiotic composition as specified in claim 1 in which the solubilizer is cetyl-trimethyl-ammonium chloride.

6. An antibiotic composition as specified in claim 1 in which the solubilizer is cetyl-trimethyl-ammonium bromide.

7. A stable aqueous solution comprising tyrothricin and as a solubilizer therefor an organic quaternary ammonium compound of the formula,

where R is a straight chain alkyl radical containing 12 to 18 carbon atoms inclusive, $R_1$, $R_2$ and $R_3$ are members of the class consisting of methyl and ethyl radicals and X is a member of the class consisting of —Cl, —Br and anions of lower aliphatic monocarboxylic acids containing not more than 4 carbon atoms.

8. A stable aqueous solution comprising tyrothricin and as a solubilizer therefor cetyl-tri-methyl-ammonium acetate.

9. A stable aqueous solution comprising tyrothricin and as a solubilizer therefor cetyl-tri-methyl-ammonium chloride.

10. A stable aqueous solution comprising tyrothricin and as a solubilizer therefor cetyl-tri-methyl-ammonium bromide.

11. A stable aqueous solution comprising tyrothricin and as a solubilizer therefor n-dodecyl-triethyl-ammonium propionate.

12. A stable aqueous solution comprising tyrothricin and as a solubilizer therefor n-tetradecyl-dimethylethyl-ammonium acetate.

ALBERT L. RAWLINS.
JAMES A. SULTZABERGER.

REFERENCES CITED

The following references are of record in the file of this patent:

UNITED STATES PATENTS

| Number | Name | Date |
|---|---|---|
| 2,264,150 | Heuter | Nov. 25, 1941 |
| 2,295,504 | Shelton | Sept. 8, 1942 |
| 2,309,592 | Heuter | Jan. 26, 1943 |

OTHER REFERENCES

"Modern Drug Encyclopedia and Therapeutic Index, Gutman, 3rd Edition (1946), pages 614 and 615.

"Prothricin" Label, Copies in Trade-Mark #413, 546, registered May 1, 1945; filed November 1, 1944 and in 167/65 P-2.